US009912536B2

(12) United States Patent
McDaniel et al.

(10) Patent No.: US 9,912,536 B2
(45) Date of Patent: Mar. 6, 2018

(54) TECHNIQUES FOR FACILITATING PORT MIRRORING IN VIRTUAL NETWORKS

(71) Applicant: Brocade Communications Systems, Inc., San Jose, CA (US)

(72) Inventors: David McDaniel, Austin, TX (US); Kiran Koushik Agrahara Sreenivasa, Round Rock, TX (US); Balaji Varadaraju, Austin, TX (US)

(73) Assignee: Brocade Communications Systems LLC, San Jose, CA (US)

( * ) Notice: Subject to any disclaimer, the term of this patent is extended or adjusted under 35 U.S.C. 154(b) by 150 days.

(21) Appl. No.: 14/874,055

(22) Filed: Oct. 2, 2015

(65) Prior Publication Data

US 2016/0294731 A1    Oct. 6, 2016

Related U.S. Application Data

(60) Provisional application No. 62/141,672, filed on Apr. 1, 2015.

(51) Int. Cl.
*H04L 12/24* (2006.01)
*H04L 12/713* (2013.01)

(52) U.S. Cl.
CPC ........ *H04L 41/0806* (2013.01); *H04L 45/586* (2013.01)

(58) Field of Classification Search
CPC . H04L 43/12; H04L 63/1408; H04L 67/1095; H04L 29/0854; H04L 49/208; H04L 41/0806; H04L 45/586
See application file for complete search history.

(56) References Cited

U.S. PATENT DOCUMENTS 5,774,660 A    6/1998  Brendel et al.
7,103,647 B2   9/2006  Aziz
(Continued)

FOREIGN PATENT DOCUMENTS

CN    103782552 A    5/2014
WO    2014139564 A1  9/2014
(Continued)

OTHER PUBLICATIONS

"Port mirroring with Linux bridges;" Waldner; Jun. 17, 2014.*
(Continued)

*Primary Examiner* — Marsha D. Banks Harold
*Assistant Examiner* — Elton Williams
(74) *Attorney, Agent, or Firm* — Fountainhead Law Group P.C.

(57) ABSTRACT

Techniques for facilitating port mirroring in virtual networks are provided. In one embodiment, a computer system can receive, from a user, port mirroring configuration information for enabling port mirroring within a virtual network, the port mirroring configuration information including an identity of a port to be mirrored and an address of a traffic receiver intended to receive traffic mirrored from the port. The computer system can further power-on a virtual machine (VM) within the virtual network in response to receiving the port mirroring configuration information, where the VM executes an instance of a virtual bridge. The computer system can then transmit one or more configuration commands to the virtual bridge, where the one or more configuration commands cause the virtual bridge to perform port mirroring in accordance with the port mirroring configuration information received from the user.

19 Claims, 7 Drawing Sheets

(56) References Cited

U.S. PATENT DOCUMENTS

| | | | |
|---|---|---|---|
| 7,292,535 | B2 | 11/2007 | Folkes et al. |
| 7,373,500 | B2 | 5/2008 | Ramelson et al. |
| 7,519,056 | B2 | 4/2009 | Ishwar et al. |
| 8,046,694 | B1 | 10/2011 | Lappas et al. |
| 8,559,314 | B2 | 10/2013 | Yedavalli et al. |
| 8,593,958 | B2 | 11/2013 | Zhang |
| 8,644,149 | B2 | 2/2014 | Yedavalli |
| 8,787,154 | B1 | 7/2014 | Medved et al. |
| 8,830,820 | B2 | 9/2014 | Mandal et al. |
| 8,937,961 | B1 | 1/2015 | Vairavakkalai |
| 8,949,410 | B2 | 2/2015 | Patel et al. |
| 8,995,272 | B2 | 3/2015 | Agarwal et al. |
| 9,038,151 | B1 | 5/2015 | Chua et al. |
| 9,124,506 | B2 | 9/2015 | Jogalekar et al. |
| 9,143,558 | B2 | 9/2015 | Blander et al. |
| 9,154,381 | B2 | 10/2015 | Dutta |
| 9,191,139 | B1 | 11/2015 | Venkata et al. |
| 9,444,842 | B2 | 9/2016 | Porras et al. |
| 9,450,817 | B1 | 9/2016 | Bahadur et al. |
| 9,450,823 | B2 | 9/2016 | Arora et al. |
| 9,467,536 | B1 | 10/2016 | Kanekar et al. |
| 9,705,783 | B2 | 7/2017 | Jogalekar et al. |
| 9,742,648 | B2 | 8/2017 | Saquib et al. |
| 9,749,401 | B2 | 8/2017 | Patil |
| 9,832,269 | B2 | 11/2017 | Usgaonkar |
| 9,853,874 | B2 | 12/2017 | Chinthalapati et al. |
| 2003/0218982 | A1 | 11/2003 | Folkes et al. |
| 2007/0002755 | A1 | 1/2007 | Matityahu et al. |
| 2007/0011685 | A1 | 1/2007 | Yim et al. |
| 2007/0041332 | A1 | 2/2007 | Jorgensen et al. |
| 2007/0153683 | A1 | 7/2007 | McAlpine |
| 2011/0145390 | A1 | 6/2011 | Kakadia et al. |
| 2012/0131222 | A1 | 5/2012 | Curtis et al. |
| 2013/0010600 | A1 | 1/2013 | Jocha et al. |
| 2013/0064079 | A1 | 3/2013 | Zhang |
| 2013/0094350 | A1 | 4/2013 | Mandal et al. |
| 2013/0124707 | A1 | 5/2013 | Ananthapadmanabha et al. |
| 2013/0311675 | A1 | 11/2013 | Kancherla |
| 2013/0318243 | A1 | 11/2013 | Chinthalapati et al. |
| 2014/0075519 | A1 | 3/2014 | Porras et al. |
| 2014/0149542 | A1 | 5/2014 | Luo et al. |
| 2014/0173018 | A1 | 6/2014 | Westphal et al. |
| 2014/0280817 | A1 | 9/2014 | Uppalapati et al. |
| 2014/0280893 | A1 | 9/2014 | Pfeifer et al. |
| 2015/0043382 | A1 | 2/2015 | Arora et al. |
| 2015/0071108 | A1 | 3/2015 | Lumezanu et al. |
| 2015/0103642 | A1 | 4/2015 | Stuart |
| 2015/0195162 | A1 | 7/2015 | Gandham et al. |
| 2015/0215156 | A1 | 7/2015 | Yoon |
| 2015/0256397 | A1 | 9/2015 | Agarwal |
| 2015/0304158 | A1 | 10/2015 | Dharmadhikari et al. |
| 2015/0319190 | A1 | 11/2015 | Kruglick |
| 2015/0334002 | A1 | 11/2015 | Jogalekar et al. |
| 2015/0350077 | A1 | 12/2015 | Durrani et al. |
| 2015/0358338 | A1* | 12/2015 | Zeitlin ............... H04L 63/1416 726/23 |
| 2016/0043941 | A1 | 2/2016 | D'Heureuse et al. |
| 2016/0112514 | A1 | 4/2016 | Usgaonkar |
| 2016/0156550 | A1 | 6/2016 | Song |
| 2016/0182336 | A1* | 6/2016 | Doctor ............... H04L 43/062 709/224 |
| 2016/0191545 | A1 | 6/2016 | Nanda et al. |
| 2016/0205071 | A1 | 7/2016 | Cooper et al. |
| 2016/0226701 | A1 | 8/2016 | Luo et al. |
| 2016/0226742 | A1 | 8/2016 | Apathotharanan et al. |
| 2016/0285729 | A1 | 9/2016 | Chinthalapati et al. |
| 2016/0285750 | A1 | 9/2016 | Saquib et al. |
| 2016/0344471 | A1 | 11/2016 | Meng et al. |
| 2016/0344621 | A1 | 11/2016 | Roeland et al. |
| 2017/0013049 | A1 | 1/2017 | Patil |
| 2017/0041209 | A1 | 2/2017 | Joshi et al. |
| 2017/0048312 | A1 | 2/2017 | Moyer |
| 2017/0104622 | A1 | 4/2017 | Sawal et al. |
| 2017/0111246 | A1 | 4/2017 | Shaw et al. |
| 2017/0324809 | A1 | 11/2017 | Patil |

FOREIGN PATENT DOCUMENTS

| | | |
|---|---|---|
| WO | 2015032027 A1 | 3/2015 |
| WO | 2016153713 A1 | 9/2016 |

OTHER PUBLICATIONS

PCT Patent Application No. PCT/US16/19510 filed on Feb. 25, 2016 by Eswara Chinthalapati et al.

International Search Report & Written Opinion for PCT Application PCT/US16/19510 dated May 25, 2016, 13 pages.

OpenFlow Switch Specification, Version 1.5.0, Open Networking Foundation, Dec. 19, 2014, 277 pages.

Akyildiz et al.: "A roadmap for traffic engineering in SDN-Openflow networks", Computer Networks, vol. 71, Jun. 19, 2014, 30 pages.

NonFinal Office Action dated Nov. 18, 2016; U.S. Appl. No. 14/805,901; (9 pgs.).

Soeurt et al, Shortest path forwarding using OpenFlow, University of Amsterdam, 58 pages, Feb. 2012.

Egilmez et al., OpenQoS: An OpenFlow Controller Design for Multimedia Delivery With End-to-End Quality of Service Over Software-Defined Networks, IEEE, 8 pages, 2012.

Adrichem et al.: "Fast Recovery in Software-Defined Networks", EWSDN, 2014, 6 pages.

Kempf et al.: "Scalable Fault Management for OpenFlow", ICC, IEEE 2012, 5 pages.

Tilmans: "Robust fault-recovery in Software-Defined Networks", Ecole Polytechnique de Louvain, Masters Thesis, 2013-2014, 104 pages.

NonFinal Office Action dated Mar. 24, 2017; U.S. Appl. No. 14/721,978; (31 pgs.).

Zartash Afzal Uzmi, Markus Nebel, Ahsan Tariq, Sana Jawad, Ruichuan Chen, Aman Shaikh, Jia Wang, and Paul Francis, "SMALTA: Practical and Near-Optimal FIB Aggregation," Pulished in: Proceedings of the Seventh Conference on emerging Networking Experiments and Technologies. Tokyo, Japan, Dec. 6-9, 2011. Article No. 29, 12 pages.

Christian E. Rothenberg, Marcelo R. Nascimento, Marcos R. Salvador, Carlos N.A. Correa, Sidney c. de Lucena, and Robert Raszuk, "Revising Routing Control Platforms with the Eyes and Muscles of Software-Defined Networking." HotSDN'12, Aug. 13, 2012, Helsinki, Finland. pp. 13-28.

Marcelo Ribeiro Nascimento, Christian Esteve Rothenberg, Marcos Rogerio Salvador and Mauricio Ferreira Magalhaesy, "QuagFlow: Partnering Quagga with OpenFlow", SIGCOMM'10, Aug. 30-Sep. 3, 2010, New Delhi, India, 2 pages.

Paul Zimmerman, "OpenDaylight Controller: Binding-Independent Components", Mar. 23, 2013, 16 printed pages. Available online: https://wiki.opendaylight.org/index.php?title=OpenDaylight_Controller:Binding-Independent_Components&oldid=331.

Paul Zimmerman, "OpenDaylight Controller: Binding Aware Components", Mar. 23, 2013, 10 printed pages. Available online: https://wiki.opendaylight.org/index.php?title=OpenDaylight_Controller:Binding_Aware_Components&oldid=339.

Ivan Pepelnjak, "Hybrid OpenFlow, the Brocade Way", Jun. 19, 2012, 3 printed pages. Available online: http://web.archive.org/web/20130514054903/http://blog.ioshints.info/2012/06/hybrid-openflow-brocade-way.html.

Notice of Allowance dated Mar. 29, 2017; U.S. Appl. No. 14/805,901; (16 pgs.).

Extended EP Search Report for EP Appln. No. 16001306.6 dated Dec. 6, 2016, 10 pages.

U.S. Appl. No. 61/832,655, filed Jun. 7, 2013 by Jogalekar et al.
U.S. Appl. No. 62/089,028, filed Dec. 8, 2014 by Durrani et al.
U.S. Appl. No. 62/005,177, filed May 30, 2014 by Durrani et al.
U.S. Appl. No. 62/141,672, filed Apr. 1, 2015 by Sreenivasa et al.
U.S. Appl. No. 62/191,073, filed Jul. 10, 2015 by Patil.
U.S. Appl. No. 62/204,388, filed Aug. 12, 2015 by Moyer.
U.S. Appl. No. 62/247,904, filed Oct. 29, 2015 by Moyer et al.
U.S. Appl. No. 62/136,922, filed Mar. 23, 2015 by Saquib et al.
U.S. Appl. No. 14/805,901, filed Jul. 22, 2015 by Jogalekar et al.

(56) References Cited

OTHER PUBLICATIONS

U.S. Appl. No. 14/721,978, filed May 26, 2015 by Durrani et al.
U.S. Appl. No. 14/848,035, filed Sep. 8, 2015 by Patil.
U.S. Appl. No. 14/918,441, filed Oct. 20, 2015 by Moyer.
U.S. Appl. No. 14/923,738, filed Oct. 27, 2015 by Saquib et al.
U.S. Appl. No. 14/923,769, filed Oct. 27, 2015 by Chinthalapati et al.
Hommes: "Fault Detection and Network Security in Software-Defined Networks with Openflow"; PhD Dissertation; PhD-FSTC-2014-06; The Faculty of Sciences, Technology and Communication; Mar. 25, 2014; 130 pages.
http://www.juniper.net/documentation/en_US/junos14.2/topics/example/cos-based-forwarding-example-cos-config-guide.html; 3 pages.
http://www.cisco.com/c/en/us/td/docs/ios/12_0s/feature/guide/gscbts.html; 56 pages.
http://blog.hoff.geek.nz/tag/cos-based-forwarding/; 16 pages.
NonFinal Office Action dated Apr. 21, 2017; U.S. Appl. No. 14/923,769; (58 pgs.).
Notice of Allowance dated Apr. 27, 2017; U.S. Appl. No. 14/923,738; ( 40 pgs.).
Notice of Allowance for U.S. Appl. No. 14/848,035 dated Jul. 14, 2017, 43 pages.
U.S. Appl. No. 15/660,744, filed Jul. 26, 2017 by Dhanashri Patil.
Notice of Allowance for U.S. Appl. No. 14/923,769 dated Oct. 20, 2017, 20 pages.
Final Office Action dated Nov. 9, 2017; U.S. Appl. No. 14/721,978; (119-7102US) (24 pgs.).
Matt Gillies: "Software Defined Networks for Service Providers: A Practical Approach"; Cisco Connect Presentation slides dated May 13, 2013; Toronto, Canada; 68 printed pages. Available online: http://www.cisco.com/c/dam/glogal/en_ca/assets/ciscoconnect/2013/assets/docs/sdn-for-sp-mgillies.pdf.
NonFinal Office Action dated Dec. 13, 2017; U.S. Appl. No. 14/918,441; (53 pgs.).

* cited by examiner

TECHNIQUES FOR FACILITATING PORT MIRRORING IN VIRTUAL NETWORKS

CROSS-REFERENCES TO RELATED APPLICATIONS

The present application claims the benefit and priority under 35 U.S.C. 119(e) of U.S. Provisional Application No. 62/141,672, filed Apr. 1, 2015, entitled "TECHNIQUES FOR FACILITATING PORT MIRRORING IN VIRTUAL NETWORKS." The entire contents of this provisional application are incorporated herein by reference for all purposes.

BACKGROUND

As known in the art, a virtual private cloud (VPC) is a logically isolated virtual network that is created as an overlay on top of a cloud service provider's public cloud infrastructure. FIG. 1 depicts an example VPC 100 according to an embodiment. As shown, VPC 100 includes a number of hosts that are implemented using virtual machines (VMs) 102, 104, 106, and 108. VMs 102 and 104 are part of a first subnet 110 of VPC 100 defined by subnet mask 10.0.1.0/24. VMs 106 and 108 are part of a second subnet 112 of VPC 100 defined by subnet mask 10.0.2.0/24. Subnets 110 and 112 are in turn connected to a virtual router 114, which can route VPC traffic between the subnets as well as to the Internet via an Internet Gateway (IGW) 116.

Many cloud service providers rely on software-defined networking (SDN) technology to provision and manage VPCs within their public cloud infrastructure. For instance, FIG. 1 depicts an SDN controller 118 that is in communication with VPC 100. SDN controllers such as controller 118 can enable cloud service providers to define and configure the virtual network resources that are needed to bring up and maintain a VPC, without making changes to the underlying physical network.

One challenge faced by customers that use VPCs provided by cloud service providers is how to maintain compliance with rules and regulations that govern workloads being processed in the cloud (e.g., Payment Card Industry (PCI) regulations, Federal Information Security Management Act (FISMA) regulations, etc.). Many of these rules/regulations require network traffic to be collected and monitored on a periodic basis for auditing and reporting purposes. In a conventional network environment that is owned/operated by the customer, the customer can achieve this by enabling hardware port mirroring on one or more ports of a physical switch/router in the network (e.g., a top-of-rack switch) and thereby mirror port traffic to a collector tool. The collector tool can then aggregate and analyze the mirrored traffic as required by the relevant rules/regulations. However, in a VPC, enabling port mirroring is more complicated because the cloud infrastructure is owned and operated by the cloud service provider rather than the customer using the VPC. Accordingly, the customer may not have appropriate privileges to access the network elements in the cloud infrastructure in order to turn on or configure port mirroring functionality.

SUMMARY

Techniques for facilitating port mirroring in virtual networks are provided. In one embodiment, a computer system can receive, from a user, port mirroring configuration information for enabling port mirroring within a virtual network, the port mirroring configuration information including an identity of a port to be mirrored and an address of a traffic receiver intended to receive traffic mirrored from the port. The computer system can further power-on a virtual machine (VM) within the virtual network in response to receiving the port mirroring configuration information, where the VM executes an instance of a virtual bridge. The computer system can then transmit one or more configuration commands to the virtual bridge, where the one or more configuration commands cause the virtual bridge to perform port mirroring in accordance with the port mirroring configuration information received from the user.

The following detailed description and accompanying drawings provide a better understanding of the nature and advantages of particular embodiments.

DETAILED DESCRIPTION

Figure 1:
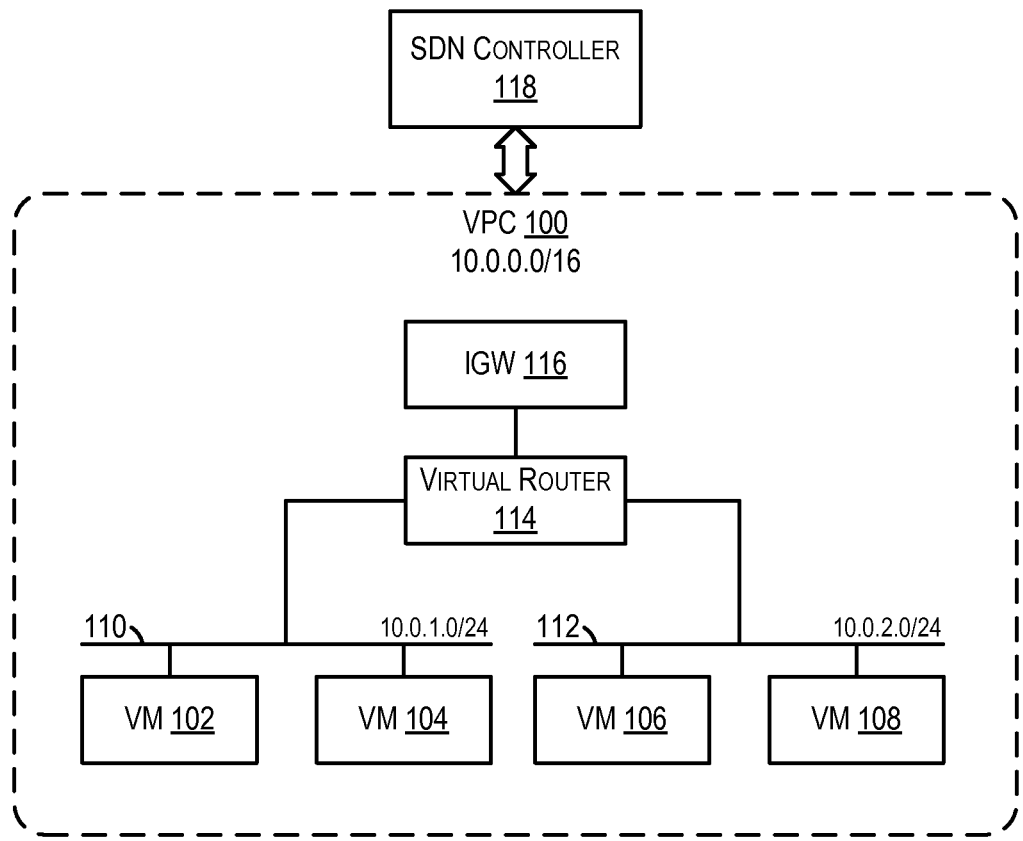
FIG. 1 depict an example VPC according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for facilitating port mirroring in a virtual network such as a virtual private cloud (VPC). In one set of embodiments, an SDN port mirroring application can be implemented that runs on top of an SDN controller communicatively coupled with the virtual network. The SDN application can receive, from a user (e.g., a customer using the virtual network), port mirroring configuration information that includes one or more ports in the virtual network to be mirrored and a receiver for the mirrored traffic (e.g., a collector tool). The SDN application can then power on a virtual machine (VM) in the virtual network that executes a virtual bridge, determine one or more configuration commands for the virtual bridge based on the received port mirroring configuration information, and transmit the configuration commands to the VM/virtual bridge. Upon receiving the commands, the virtual bridge can carry out port mirroring in accordance with the user-provided port mirroring configuration information (e.g., establish a mirror port, tap network traffic at the specified port(s) to mirror, and send the tapped traffic out the mirror port to the traffic receiver).

In some embodiments, the traffic receiver may be local—in other words, reside within the same virtual network as the source of the mirrored traffic. In these embodiments, the virtual bridge can directly send the traffic out the mirror port without modification. In other embodiments, the traffic receiver may be remote—in other words, reside within an entirely separate network, such as a different VPC that is located across a wide area network like the Internet. In these embodiments, the user can specify, as part of the port mirroring configuration information provided to the SDN application, one or more parameters for tunneling (via, e.g., GRE, IPSec, IP-IP or some other tunneling protocol) the mirrored traffic to the traffic receiver. Upon receiving these parameters, the virtual bridge can encapsulate all outgoing traffic on the mirror port using the appropriate tunneling protocol, thereby ensuring that the mirrored traffic reaches the traffic receiver at the remote network.

With the techniques described above, there is no need for the user of the SDN application to have control over the network elements underlying the virtual network in order to enable port mirroring within the network. Instead, the user need only have access to the application itself, which can independently turn on/off port mirroring and perform other related tasks (e.g., encapsulation of mirrored traffic) via the dynamically provisioned VM. Thus, these techniques may be particularly beneficial for customers that use a VPC operated by a cloud service provider, since the customers can enable port mirroring as needed within the VPC in order to meet their data auditing/reporting/monitoring obligations, without requiring access to the physical network infrastructure.

In certain alternative embodiments, the SDN application can also enable port mirroring by sending appropriate configuration commands to a virtual router resident in the virtual network (rather than to a dynamically provisioned VM). In these alternative embodiments, the configuration commands can cause the virtual router to mirror (and encapsulate, if needed) traffic at an appropriate mirror port of the router in accordance with the user-provided port mirroring configuration information.

The foregoing and other aspects of the present disclosure are described in further detail in the sections that follow.

2. Virtual Network Environment

Figure 2:
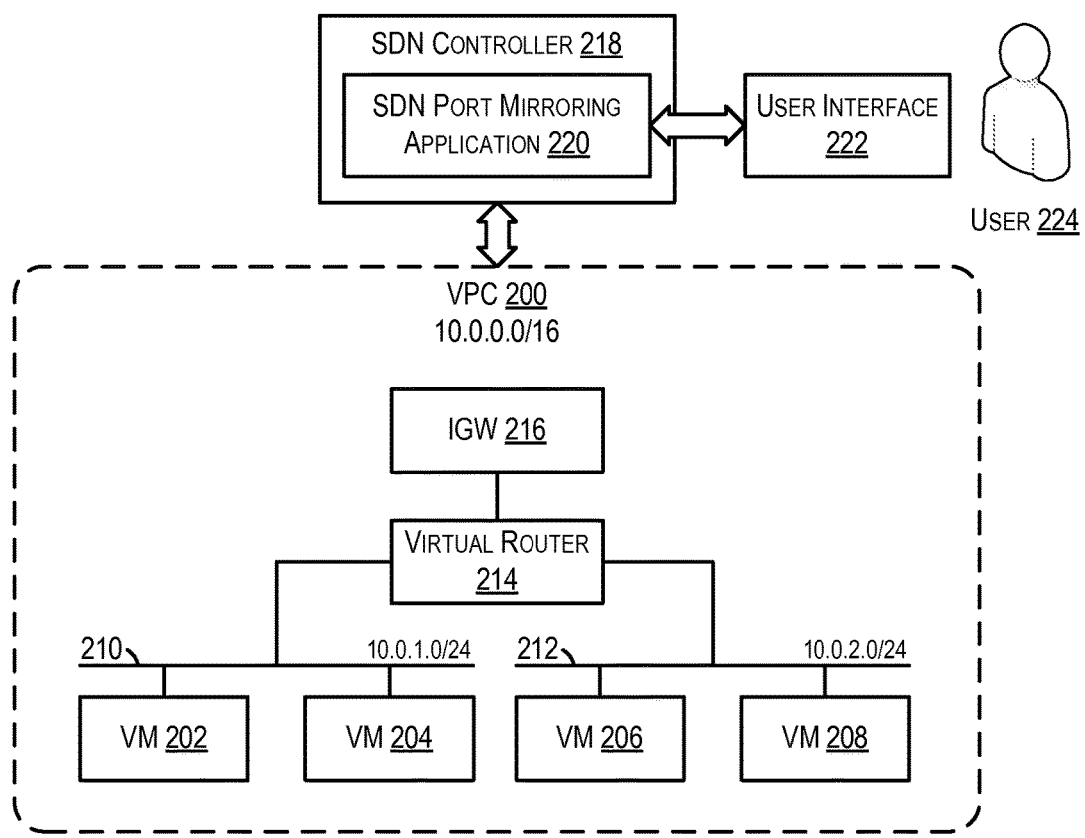
FIG. 2 depicts a virtual network environment according to an embodiment.

FIG. 2 depicts a virtual network environment that supports port mirroring via an SDN application according to an embodiment. As shown, FIG. 2 depicts a VPC 200 that is similar in certain respects to VPC 100 of FIG. 1. For example, VPC 200 includes VMs 202-208 (in subnets 210/212), a virtual router 214, an IGW 216, and an SDN controller 218. These components are similar to VMs 102-108, virtual router 114, IGW 116, and SDN controller 118 respectively of FIG. 1. In a particular embodiment, SDN controller 218 can be an OpenDaylight controller and virtual router 214 can be a Vyatta virtual router developed by Brocade Communications Systems, Inc.

In addition to the foregoing components, VPC 200 includes a novel SDN port mirroring application 220 running on SDN controller 218 that is communicatively coupled with a user interface (UI) 222 operated by a user 224. As detailed below, at a time user 224 wishes to enable port mirroring with respect to a particular port or group of ports in VPC 200, user 224 can provide to application 220 (via UI 222) configuration information pertaining to how the mirroring should be performed (i.e., identity of port(s) to be mirrored, location of receiver, tunneling configuration, etc.). Application 220 can then use this information to determine and transmit configuration commands, via controller 218, to one or more components of VPC 200 in order to initiate the mirroring process. In one set of embodiments (described with respect to FIGS. 3 and 4 below), application 220 can transmit the configuration commands to a dynamically provisioned VM within VPC 200 that performs the port mirroring via a virtual bridge hosted within the VM. In another set of embodiments (described with respect to FIGS. 5 and 6 below), application 220 can transmit the configuration commands to virtual router 214 so that router 214 can carry out the port mirroring function.

It should be appreciated that FIG. 2 is illustrative and not intended to limit embodiments of the present invention. For example, although FIG. 2 depicts a particular configuration of VMs and network resources within VPC 200, other configurations/arrangements are possible. Further, the various components shown in FIG. 2 may have sub-components or functions that are not specifically described. One of ordinary skill in the art will recognize other modifications, variations, and alternatives.

3. Port Mirroring Workflow (VM Use Case)

Figure 3:
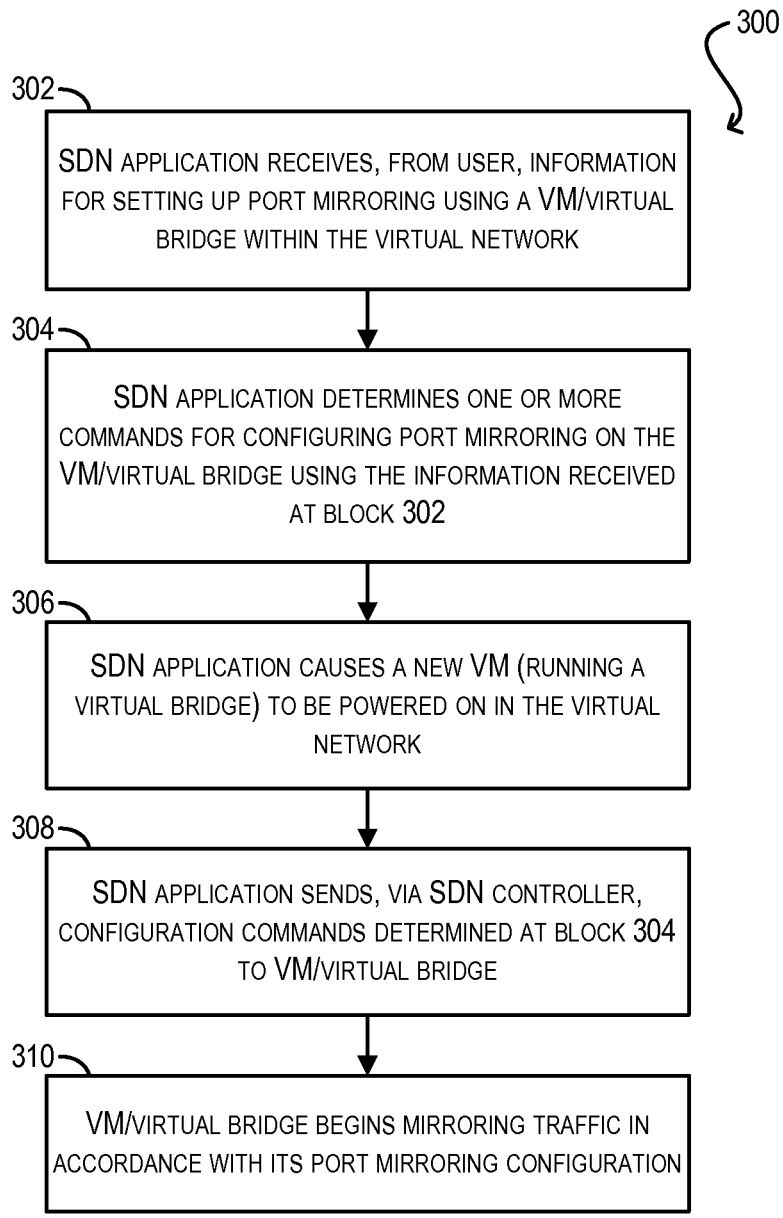
FIG. 3 depicts a workflow for enabling, by an SDN application, port mirroring using a dynamically provisioned VM according to an embodiment.

FIG. 3 depicts a workflow 300 that can be performed by SDN port mirroring application 220 of FIG. 2 for implementing port mirroring within VPC 200 using a dynamically provisioned VM and virtual bridge according to an embodiment.

Starting with block 302, application 220 can receive, from user 224, port mirroring configuration information indicating how user 224 would like to setup port mirroring using a VM/virtual bridge within VPC 200. For example, this port mirroring configuration information can include a local IP address and port number for communicating with the VM, the IP address and port number of the traffic receiver, the port(s) of the virtual bridge that should be mirrored, and the port of the virtual bridge that should be used as the mirror port (this mirror port will act as a "tunnel source" in the case that tunneling is needed). This information can also include other parameters depending on the particular implementation. For example, in embodiments where the traffic receiver may support multiple tunneling protocols, the port mirroring configuration information can include an indication of a particular tunneling protocol to use (e.g., GRE, IPSec, IP-in-IP, etc.).

The code listing below identifies, as a series YANG model definitions, exemplary input parameters that may be received by application 220 in an embodiment where the VM/virtual bridge to be configured is a Linux installation running OpenVirtualSwitch (OVS):

Listing 1

```
module portmirror {
    namespace "urn:com.brocade.apps.portmirror";
    prefix portmirror;
    import ietf-inet-types {
        prefix "inet";
    }
    rpc set-port-mirroring {
        description
            "set port mirroring";
        input {
            leaf switch_ipAddress {
                type inet:ip-address;
            }
            leaf switch_portNumber {
                type inet:port-number;
                default 22;
            }
            leaf switch_userName {
                type string;
            }
            leaf switch_ssh_key {
```

-continued

Listing 1

```
      type string;
    }
    leaf receiver_ipAddress {
      type inet:ip-address;
    }
    leaf receiver_portNumber {
      type inet:port-number;
      default 22;
    }
    leaf receiver_userName {
      type string;
    }
    leaf receiver_ssh_key {
      type string;
    }
    leaf interface_to_mirror {
      type string;
    }
    leaf local_ip {
      type inet:ip-address;
    }
    leaf remote_ip {
      type inet:ip-address;
    }
    leaf tunnel_source_interface {
      type string;
    }
   }
  }
}
```

It should be noted that the information received at block 302 may be entered by user 224 into UI 222 of FIG. 2, which is then communicated via an appropriate protocol (e.g., RESTCONF) to application 220. Alternatively, this information may be captured in a client-side script (e.g., a Python script). Further, in certain embodiments, UI 222/application 220 may include functionality for saving, editing, and retrieving different port mirroring profiles so that user 224 does not need to re-enter this information each time he/she wishes to enable port mirroring.

At block 304, application 220 can determine one or more commands for configuring port mirroring using the VM/virtual bridge in accordance with the information received at block 302. In a particular embodiment, these commands can take the form of OpenFlow commands (if the VM/virtual bridge is configured to communicate with SDN controller 218 using the OpenFlow protocol). In alternative embodiments, these commands can be formatted according to any other protocol (e.g., Secure Shell (SSH), etc.).

At block 306, application 220 can cause, via SDN controller 218, a new VM to be powered-on within VPC 200 that is configured to run the virtual bridge. Application 220 can then send the configuration commands determined at block 304 to the VM/virtual bridge in order to configure the virtual bridge for port mirroring as specified by the user (block 308). For instance, in response to block 308, the virtual bridge can establish a mirror port, provision a tunnel on the mirror port, and place a tap on the port(s) to be mirrored.

Finally, at block 310, the virtual bridge can begin mirroring traffic per its port mirroring configuration. For example, the virtual bridge can tap network traffic received on the port(s) to be mirrored, encapsulate the tapped/mirrored traffic using an appropriate tunneling protocol, and then send out the encapsulated traffic via the mirror port to the IP address of the traffic receiver. The virtual bridge can continue performing this mirroring until, e.g., it receives an indication from application 220 that it should stop operation, or its port mirroring configuration is changed.

Figure 4:
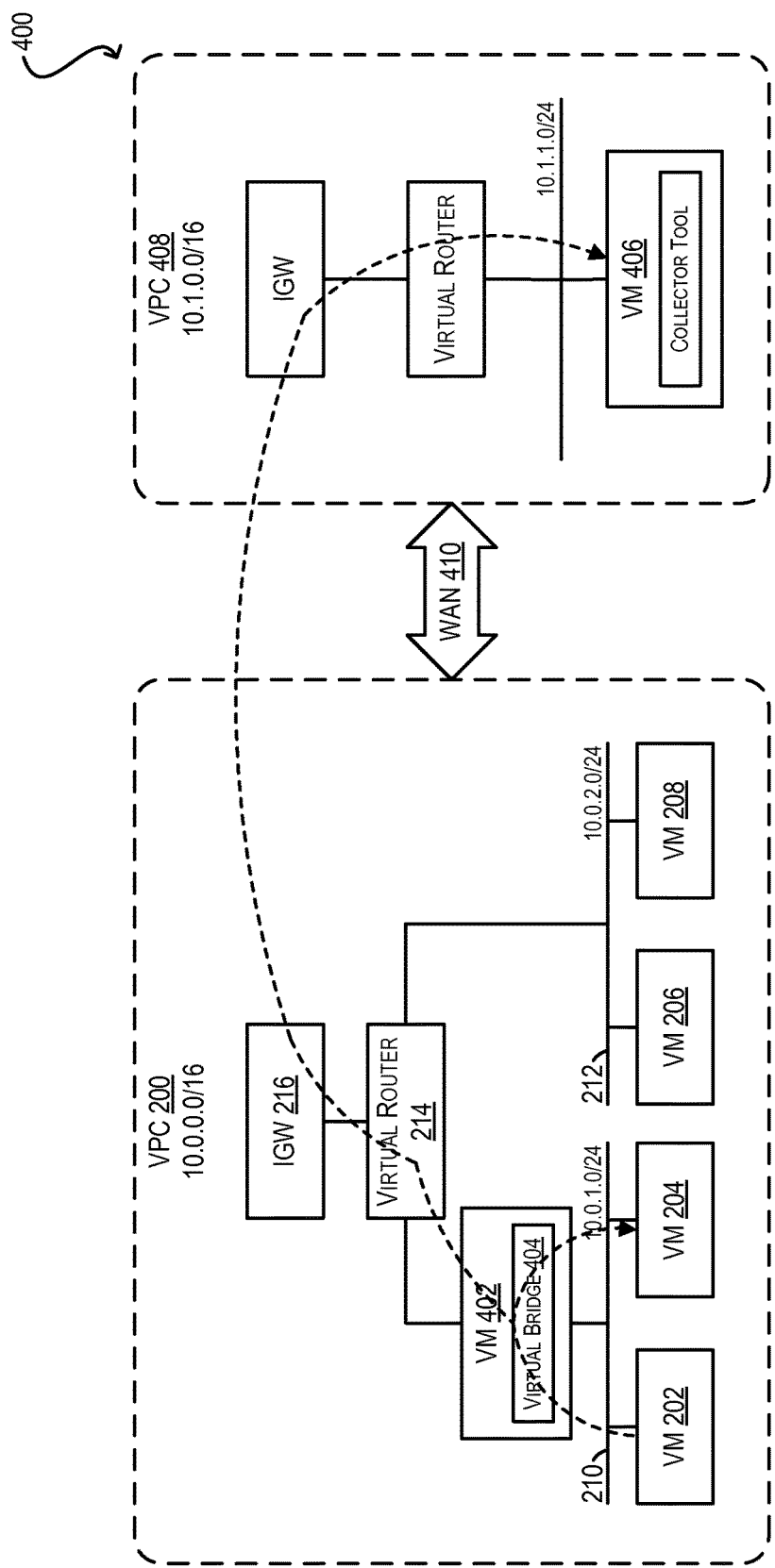
FIG. 4 depicts a diagram illustrating the effects of the workflow of FIG. 3 according to an embodiment.

To illustrate the effects of workflow 300, FIG. 4 depicts a diagram 400 in which workflow 300 has be applied to mirror traffic between VMs 202 and 204 of VPC 200 to a traffic receiver VM 406 (running a collector tool) located in a remote VPC 408. As shown via the dotted lines in FIG. 4, traffic originating from VM 202 is intercepted/tapped by a VM 402/virtual bridge 404 that has been dynamically provisioned within VPC 200 per block 306 of workflow 300. This tapped traffic is encapsulated and forwarded through virtual router 214/IGW 216, and transmitted over WAN 410 via a tunnel. This traffic is subsequently received by the IGW of VPC 408 and forwarded through a virtual router to VM 406. Although FIG. 4 shows an example in which traffic originating from VM 202 and destined for VM 204 is mirrored, virtual bridge 404 can also perform this mirroring on traffic going in the opposite direction (i.e., from VM 204 to VM 202).

4. Port Mirroring Workflow (Virtual Router Use Case)

Figure 5:
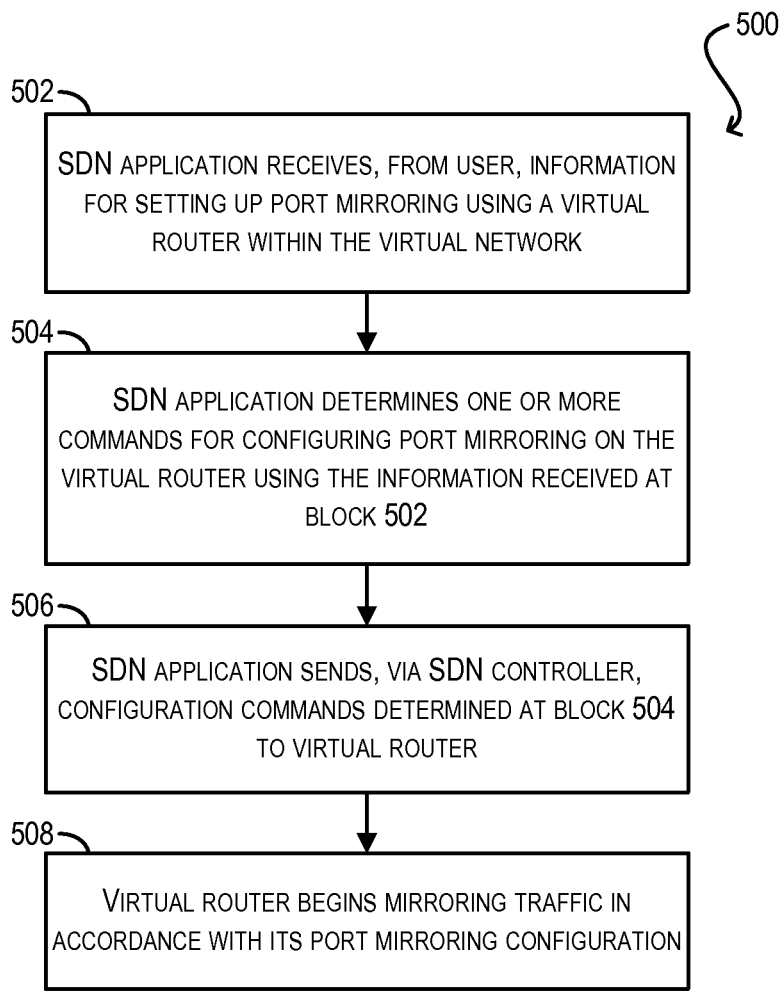
FIG. 5 depicts a workflow for enabling, by an SDN application, port mirroring using a virtual router according to an embodiment.

FIG. 5 depicts an alternative workflow 500 that can be performed by SDN port mirroring application 220 of FIG. 2 for implementing port mirroring within VPC 200 using a virtual router (e.g., router 214) according to an embodiment.

Starting with block 502, application 220 can receive user-defined information for setting up port mirroring using a virtual router. This information can be similar to the information received at block 302 of FIG. 3.

At block 504, application 220 can determine one or more commands for configuring port mirroring using the virtual router in accordance with the received information. These configuration commands may or may not be similar to the configuration commands determined in the VM use case, depending on how the virtual router is designed. In a particular embodiment, these commands can take the form of NETCONF commands (if the virtual router is configured to communicate with SDN controller 218 using the NETCONF protocol). In alternative embodiments, these commands can be formatted according to any other southbound protocol.

At block 506, application 220 can send (via SDN controller 218) the configuration commands determined at block 504 to the virtual router in order to configure the router as specified by the user. For instance, in response to block 506, the virtual router can establish a mirror port, provision a tunnel on the mirror port, and place a tap on the port(s) to be mirrored.

Finally, at block 508, the virtual router can begin mirroring traffic per its port mirroring configuration. For example, the virtual router can tap network traffic received on the port(s) to be mirrored, encapsulate the tapped/mirrored traffic using an appropriate tunneling protocol, and then send out the encapsulated traffic via the mirror port to the IP address of the traffic receiver. The virtual router can continue performing this mirroring until, e.g., it receives an indication from application 220 that it should stop operation, or its port mirroring configuration is changed.

Figure 6:
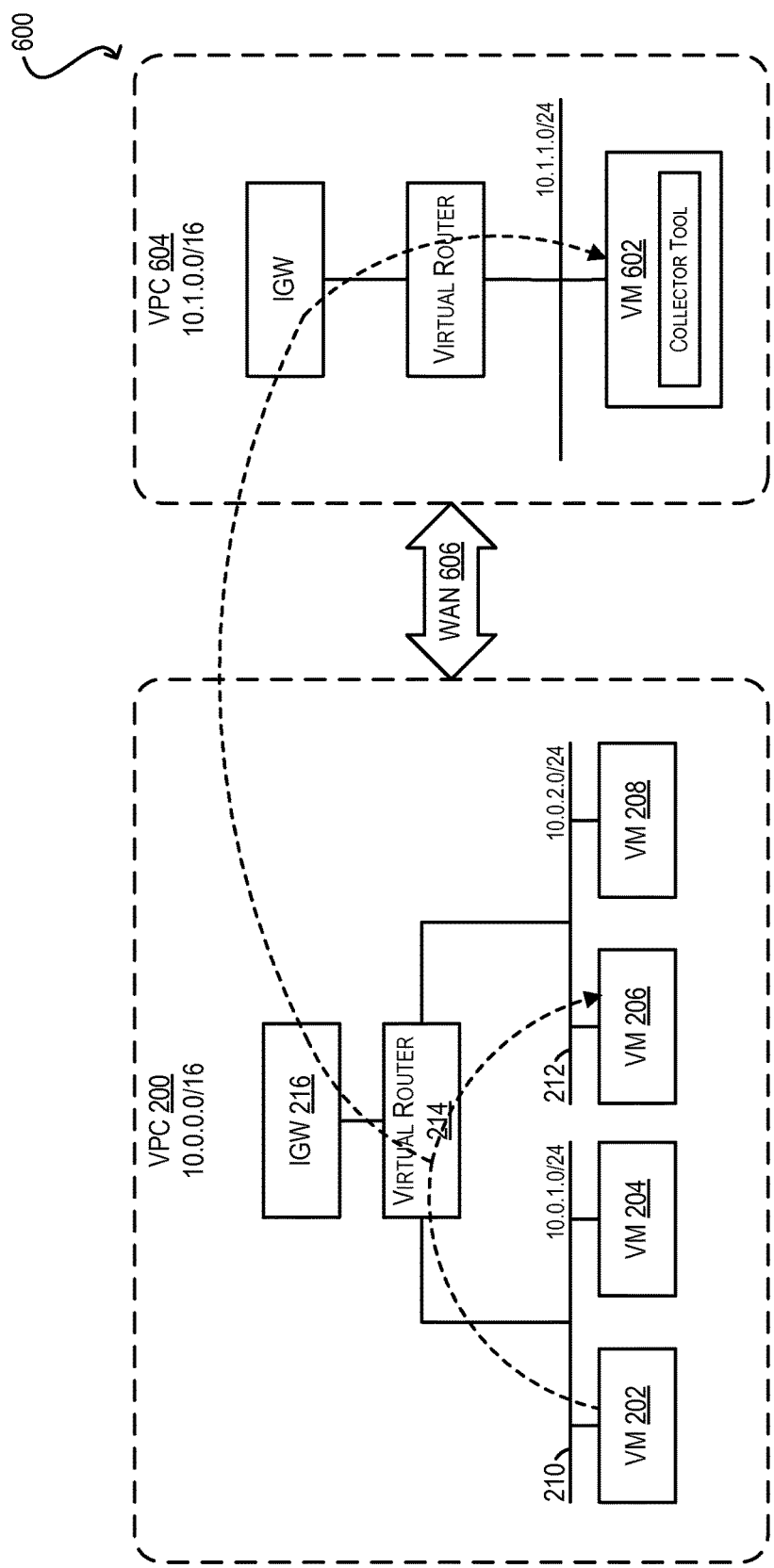
FIG. 6 depicts a diagram for illustrating the effects of the workflow of FIG. 5 according to an embodiment.

To illustrate the effects of workflow 500, FIG. 6 depicts a diagram 600 in which workflow 300 has be applied to mirror traffic between VMs 202 and 206 of VPC 200 to a traffic receiver VM 602 (running a collector tool) located in a remote VPC 604. As shown via the dotted lines in FIG. 6, traffic originating from VM 202 is intercepted/tapped by virtual router 214, encapsulated and forwarded to IGW 216, and then transmitted over WAN 606 via a tunnel. This traffic is subsequently received by the IGW of VPC 604 and forwarded through a virtual router to VM 602. Although FIG. 6 shown an example in which traffic originating from VM 202 and destined for VM 206 is mirrored, virtual router 214 can also perform this mirroring on traffic going in the opposite direction (i.e., from VM 206 to VM 202).

It should be appreciated that FIGS. 3-6 are illustrative and various modifications are possible. For example, while FIGS. 4 and 6 depict scenarios where the traffic receiver resides in a remote VPC, in alternative embodiments the traffic receiver may be local to the VPC where the traffic originated from (e.g., VPC 200). In these cases, virtual bridge 404 or virtual router 214 will not need to encapsulate/tunnel the mirrored traffic; instead, virtual bridge 404 or virtual router 214 can send the mirrored traffic to the traffic receiver without modification.

As another example, although FIGS. 4 and 6 depict scenarios where mirroring is perform on traffic traveling in a particular direction (i.e., from VM 202 to VM 204/206), in alternative embodiments virtual bridge 404/virtual router 214 can also perform this mirroring on traffic going in the opposite direction (i.e., bidirectional mirroring).

Further, it should be noted that there may be certain cases where it is preferable to use the VM embodiment shown in FIGS. 3 and 4 over the virtual router embodiment shown in FIGS. 5 and 6 (or vice versa). For instance, the VM embodiment may be preferable in a situation where the traffic to be tapped flows solely along a local segment/subnet, since such traffic will not pass through the virtual router. The VM embodiment may also be preferable in situations where the virtual router installed in the virtual network is not specifically designed/configured to support port mirroring in accordance with the techniques described above.

5. Computer System

Figure 7:
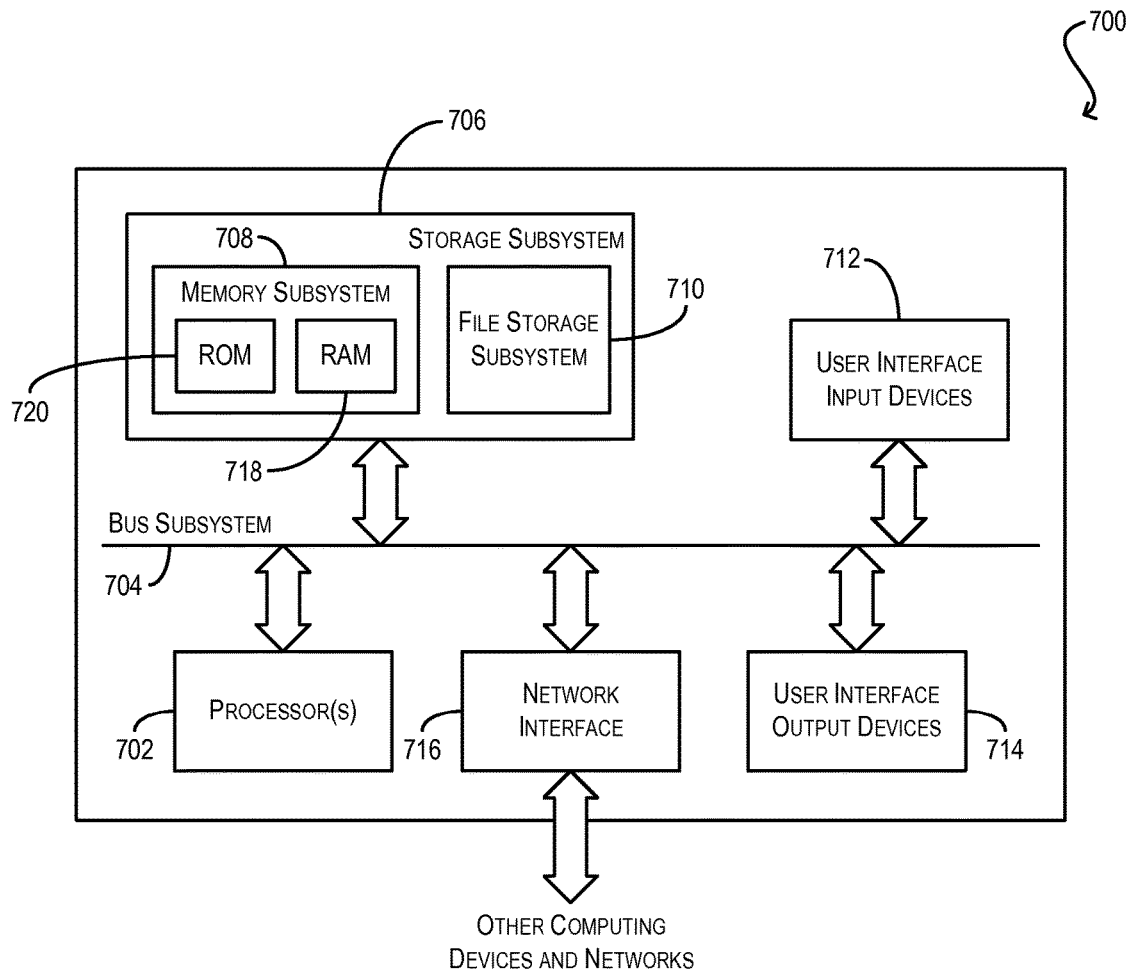
FIG. 7 depicts a computer system according to an embodiment.

FIG. 7 is a simplified block diagram of a computer system 700 according to an embodiment. In a particular embodiment, computer system 700 can be used to implement any of the computing devices/components described the foregoing disclosure, such as SDN controller 218 of FIG. 2. As shown in FIG. 7, computer system 700 can include one or more processors 702 that communicate with a number of peripheral devices via a bus subsystem 704. These peripheral devices can include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computing devices or networks. Embodiments of network interface subsystem 716 can include wired (e.g., coaxial, twisted pair, or fiber optic Ethernet) and/or wireless (e.g., Wi-Fi, cellular, Bluetooth, etc.) interfaces.

User interface input devices 712 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 700.

User interface output devices 714 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 can include a memory subsystem 708 and a file/disk storage subsystem 710. Subsystems 708 and 710 represent non-transitory computer-readable storage media that can store program code and/or data that provide the functionality of various embodiments described herein.

Memory subsystem 708 can include a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and not intended to limit embodiments of the present invention. Many other configurations having more or fewer components than computer system 700 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described in the context of VPCs, the techniques described herein may be used to facilitate/enable port mirroring in any type of software defined network. Further, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
receiving, by a computer system from a user, port mirroring configuration information for enabling port mirroring within a network, the port mirroring configuration information including an identity of a port to be mirrored and an address of a traffic receiver intended to receive traffic mirrored from the port;
powering-on, by the computer system, a virtual machine within the network in response to receiving the port mirroring configuration information, the virtual machine executing an instance of a virtual bridge; and transmitting, by the computer system, one or more configuration commands to the virtual bridge, the one or more configuration commands causing the virtual bridge to perform port mirroring in accordance with the port mirroring configuration information received from the user.

2. The method of claim 1 wherein the network is a virtual network.

3. The method of claim 2 wherein the virtual network is a virtual private cloud (VPC) operated by a cloud service provider, and wherein the user is a customer using the VPC.

4. The method of claim 1 wherein the user does not have privileges for modifying hardware configurations of network elements in the network.

5. The method of claim 1 wherein the traffic receiver resides locally within the network.

6. The method of claim 1 wherein the traffic receiver resides within a remote network.

7. The method of claim 6 wherein the port mirroring configuration information further includes tunnel configuration information for tunneling the mirrored traffic to the traffic receiver in the remote network.

8. The method of claim 7 wherein the tunnel configuration information includes a tunnel source interface and a tunneling protocol.

9. The method of claim 1 wherein the one or more configuration commands cause the virtual bridge to:
   establish a mirror port;
   tap network traffic received at the port to be mirrored; and
   send out the tapped network traffic on the mirror port to the traffic receiver.

10. The method of claim 9 wherein the one or more configuration commands further cause the virtual bridge to:
    configure a tunnel on the mirror port; and
    encapsulate the tapped network traffic according to a tunneling protocol prior to sending out the tapped network traffic on the mirror port.

11. The method of claim 1 where the computer system is a software-defined networking (SDN) controller, and wherein the receiving, the powering-on, and transmitting are performed via an SDN application running on the SDN controller.

12. The method of claim 1 further comprising saving the port mirroring configuration information as a port mirroring profile for later reuse by the user.

13. The method of claim 1 further comprising transmitting the one or more configuration commands to a virtual router within the network, the one or more configuration commands causing the virtual router to perform port mirroring in accordance with the port mirroring configuration information received from the user.

14. A non-transitory computer readable storage medium having stored thereon program code executable by a computer system, the program code causing the computer system to:

receive, from a user, port mirroring configuration information for enabling port mirroring within a network, the port mirroring configuration information including an identity of a port to be mirrored and an address of a traffic receiver intended to receive traffic mirrored from the port;

power-on a virtual machine within the network in response to receiving the port mirroring configuration information, the virtual machine executing an instance of a virtual bridge; and transmit one or more configuration commands to the virtual bridge, the one or more configuration commands causing the virtual bridge to perform port mirroring in accordance with the port mirroring configuration information received from the user.

15. The non-transitory computer readable storage medium of claim 13 wherein the traffic receiver resides within a remote network, and wherein the port mirroring configuration information further includes tunnel configuration information for tunneling the mirrored traffic to the traffic receiver in the remote network.

16. The non-transitory computer readable storage medium of claim 13 wherein the computer system is a software-defined networking (SDN) controller, and wherein the receiving, the powering-on, and transmitting are performed via an SDN application running on the SDN controller.

17. A computer system comprising:
a processor; and
a non-transitory computer readable medium having stored thereon program code that, when executed by the processor, causes the processor to:

receive, from a user, port mirroring configuration information for enabling port mirroring within a network, the port mirroring configuration information including an identity of a port to be mirrored and an address of a traffic receiver intended to receive traffic mirrored from the port;

power-on a virtual machine within the network in response to receiving the port mirroring configuration information, the virtual machine executing an instance of a virtual bridge; and transmit one or more configuration commands to the virtual bridge, the one or more configuration commands causing the virtual bridge to perform port mirroring in accordance with the port mirroring configuration information received from the user.

18. The computer system of claim 17 wherein the traffic receiver resides within a remote network, and wherein the port mirroring configuration information further includes tunnel configuration information for tunneling the mirrored traffic to the traffic receiver in the remote network.

19. The computer system of claim 17 wherein the computer system is a software-defined networking (SDN) controller, and wherein the receiving, the powering-on, and transmitting are performed via an SDN application running on the SDN controller.

* * * * *